UNITED STATES PATENT OFFICE.

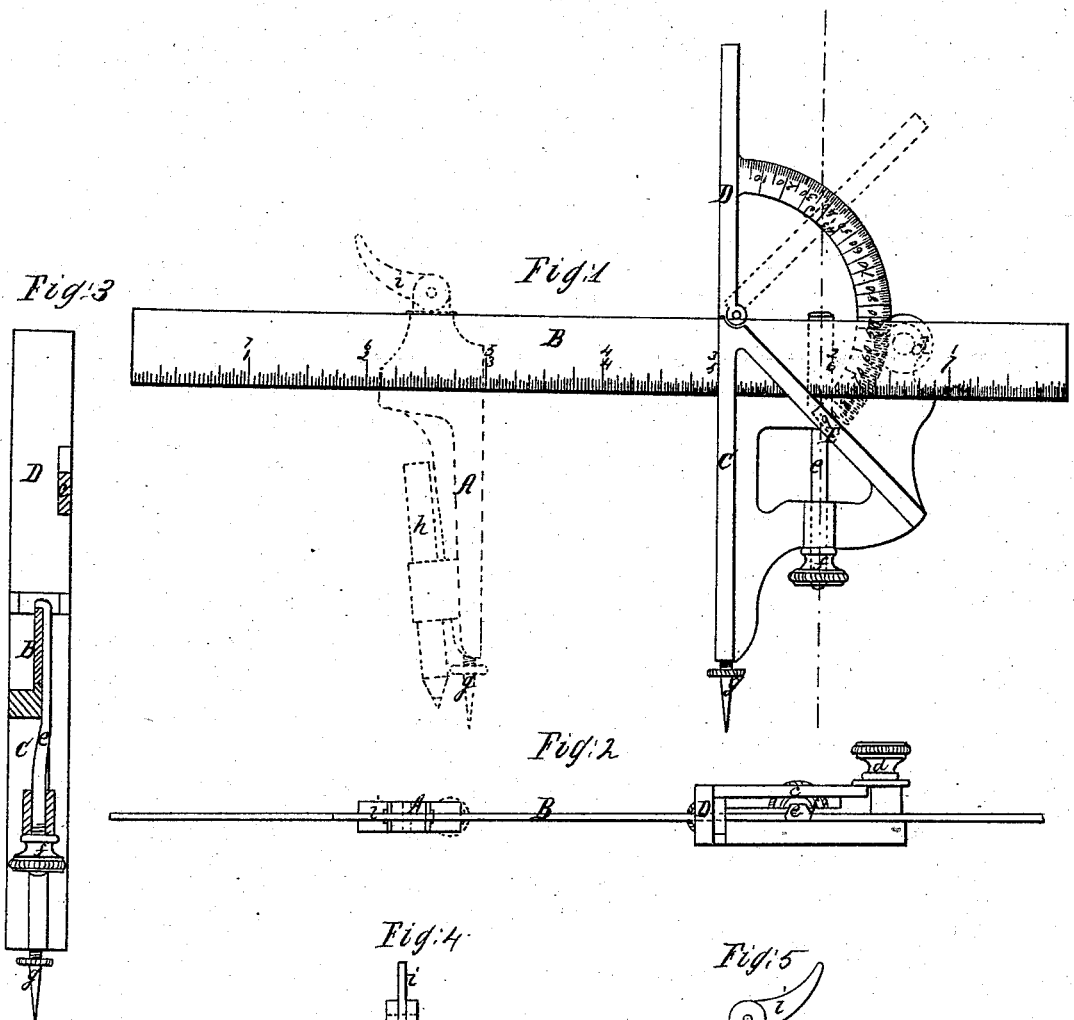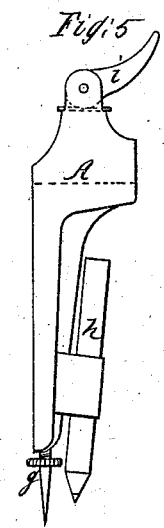

ORRIL R. CHAPLIN, OF SALEM, MASSACHUSETTS.

IMPROVEMENT IN COMBINED SQUARE AND BEVEL.

Specification forming part of Letters Patent No. 54,503, dated May 8, 1866.

*To all whom it may concern:*

Be it known that I, ORRIL R. CHAPLIN, of Salem, in the county of Essex and State of Massachusetts, have invented a new and useful Improvement in Combination Squares and Bevels for the use of Mechanics; and I do hereby declare the following to be a full, clear, and exact description of the same, reference being had to the accompanying drawings and the letters of reference marked thereon, making a part of this specification, in which—

Figure 1 is an elevation of the instrument adjusted for use as a T or try square, drawn in black lines, and also shown in red lines as adjusted for use as a bevel or protractor, and also as a compasses or caliper. Fig. 2 is an edge view of the instrument. Fig. 3 is a section on line $a\,b$ of Fig. 1. Figs. 4 and 5 are views of the compass-leg A.

The nature of my invention consists, first, in so combining the several parts of a try or T square, protractor, compasses, caliper, and centering-square that it can be used for the several purposes to which such instruments can be applied with little or no change; second, in making the tongue of the square movable, so that the beam may be adjusted to any point on the tongue that may be desired for the purpose of adapting it to be used either as a T or try square, a centering-square, or a gage for the purpose of gaging the depth of grooves; third, in hinging one arm of the beam and providing it with a graduated sector, upon which a thumb-nut may be made to act to clamp it at any desired angle; fourth, in attaching to the square-tongue a supplementary arm carrying a compass-point and a pencil-holder, and also attaching to the outer end of the square-beam a compass-point, all for the purpose of adapting the instrument to use as a compasses or caliper.

To enable others skilled in the arts to make and use my invention, I will now proceed to describe its construction and operation.

The same letters refer to the same parts in all the drawings.

B is the tongue; C, the right-angle portion of the beam; D, the hinged portion of the beam, provided with a graduated sector, $c$. E is a rib on the beam, placed at an angle of forty-five degrees to the edge of the tongue, to be used in connection with the hinged beam D, when placed at the same angle of forty-five degrees, for centering shafts.

$d$ is the thumb-nut, by which the graduated sector $c$, attached to the hinged portion D of the square-beam C, may be clamped and held firm at any desired angle.

$e$ is a clamp-bolt, and $f$ a thumb-nut on the same, by means of which the beam C is firmly clamped to the square-tongue B at any desired point in its length.

A is a supplementary compass-leg, carrying the point $g$ and pencil $h$, all of which may be readily attached to the square-tongue B by means of the eccentric-cam $i$, and when so attached, as shown in red lines in Fig. 1, may be used as a compasses, and by removing the compass-points $g\,g$ it may be used as a caliper.

The application of my invention is as follows: If to be used as an ordinary T or try square, the instrument is to be in the condition represented by the black lines in Fig. 1. If as a centering-square, the hinged portion of the beam is thrown around and clamped at an angle of forty-five degrees, as shown in red lines in Fig. 1, and the tongue moved and clamped in such a position that the greater portion of its length shall project from that part of the beam which contains the sector and tongue-clamps.

For use as a protractor or bevel it is only necessary to clamp the hinged portion of the beam at the desired angle with the parts in the position shown in Fig. 1, except that the compass-leg A and the point $g$ in the end of the square-beam are removed. It may be made useful as a gage for gaging the depth of grooves by moving the beam on the tongue until the face of the beam coincides with the graduation indicating the distance from the end of the tongue that is equal to the desired depth of the groove.

By placing the supplementary compass-leg on the tongue, as shown in red lines in Fig. 1, and screwing the point $g$ into the end of the beam C, we have a good beam-compasses, which may be readily set at any given radius within the length of the tongue by the aid of the graduations on the square-tongue.

By removing the points $g\,g$ the instrument is in condition to be used as a caliper, and by placing the face of the beam C against one side of a shaft and the leg A against the other and clamping it the diameter of the shaft is registered and may be read on the graduated tongue.

What I claim as my invention, and wish to secure by Letters Patent, is—

The combination of the movable tongue B and beam C affixed thereto with the movable or hinged beam D, substantially as described.

ORRIL R. CHAPLIN.

Witnesses:
JUSTIN HINDS,
CHAS. H. HINDS.